3,290,260
Patented Dec. 6, 1966

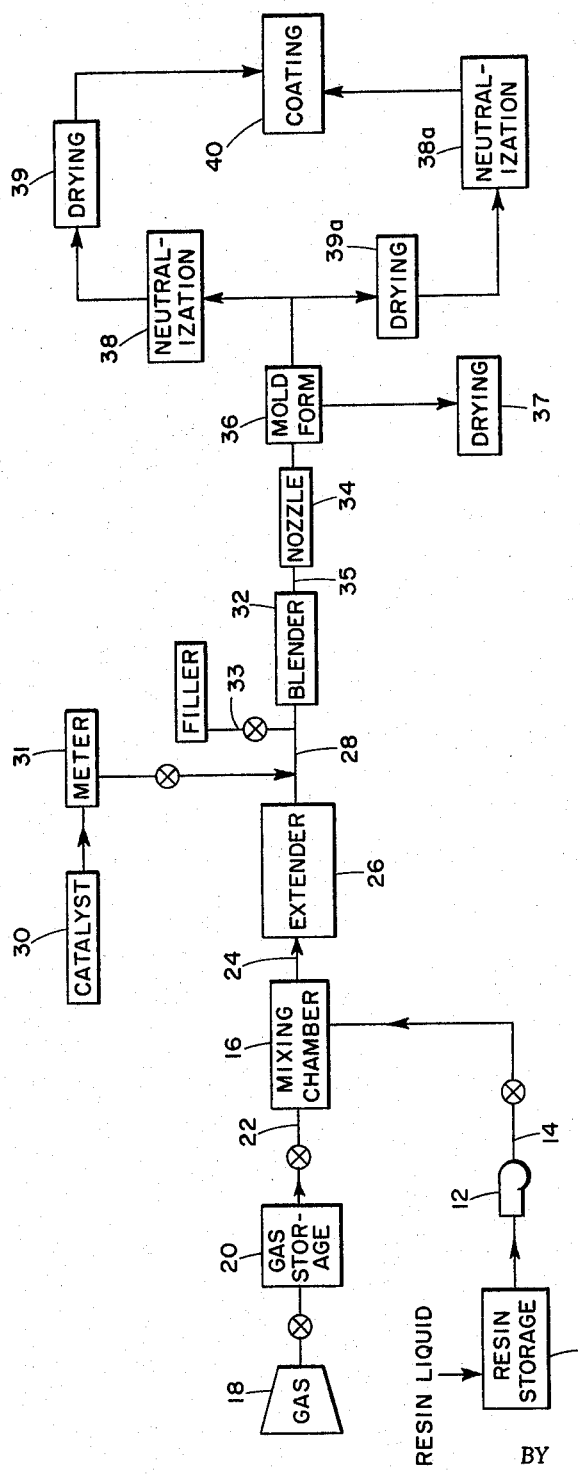

3,290,260
METHOD FOR MAKING POROUS RESIN STRUCTURES
Henry L. Buccigross, West Roxbury, Mass., assignor to Arthur D. Little, Inc., Cambridge, Mass., a corporation of Massachusetts
Filed Aug. 16, 1963, Ser. No. 302,579
1 Claim. (Cl. 260—2.5)

This application is a continuation-in-part of my application filed December 15, 1961, Serial Number 159,552, now abandoned, for Method and Apparatus for Making Foamed-in-Place Resins.

This invention relates to foamed resin structures and more particularly to a method for forming porous structures from aldehyde-condensation resins.

In recent years, porous resin structures of the rigid or semi-rigid type have found widespread use in many varied applications. Among these applications may be listed insulating material (formed either directly in place or formed as structural configurations), acoustical tiles, configurations used to contain liquid and support items such as are used for displaying flowers in the floral industry, packing for filters, decorative items, and various molded articles.

In the prior art formation of these rigid or semi-rigid foamed resins it is customary to form a water solution or dispersion of a suitable catalyst and surfactant and then add to the foam a concentrated resin solution or dispersion, in effect, coating the foam bubbles with the resin. This method, even when care is exercised in the introduction of the concentrated resins, normally results in materially increasing the density of the originally foamed material. This in turn means that the original foaming must be carried out to an extent such that its density is of the order of one-half that required in the foamed resin, or that if foaming is not carried out to such an extent, excessive weight in the dry foamed resin must be tolerated. This in turn introduces problems in density control.

It will be appreciated that the prior art method also requires the handling of two primary liquids, i.e., the water containing the catalyst and surfactant, as well as the liquid resin system. The use of these two separate liquids involves the use of two separate sets of equipment for storing, handling and metering.

Porous resins made by these prior art techniques have not been completely porous in that the final rigid foam is formed of a substantial number of individual closed cells. Moreover, many of the cell walls are continuous, thus inhibiting the free flow of liquids in and out of the resulting porous materials. It would therefore also be desirable to have available a truly porous structure formed of aldehyde-condensation resins. Because these resins are relatively strong and fairly resistant to atmospheric conditions, as well as to heat, they should find wide use in porous form.

It would therefore be desirable to be able to provide a process for foaming a thermosetting aldehyde-condensation resin which produced a porous structure, the density and cell size of which could be controlled. It would also be desirable to have such a process which requires the handling of only one primary liquid.

I have found that by the process of this invention it is possible to foam thermosetting resins to form relatively rigid porous structures by first extending a liquid resin system (with or without fillers) to form a foam, incorporating a catalyst into the foam by blending or kneading subsequent to the actual foaming and finally neutralizing the porous structure then formed. The process of this invention has the advantage that only one liquid is handled in quantity. It is moreover very flexible with respect to the type of apparatus which may be employed in the foaming step. Once the foam is formed, it is introduced into mold forms which may of course be of any shape and size, or in any location. In most cases, it will be desirable to neutralize the acid catalyst as well as to exercise some control over the degree of flexibility of the finished product, its density, and cell size.

It is therefore the primary object of this invention to provide an improved process for forming porous bodies from the thermosetting, aldehyde-condensation resins. It is another object of this invention to provide a process of the character described which requires handling only one liquid constituent in quantity. It is yet another object of this invention to provide such a process which permits accurate control over the density, cell size and flexibility of the porous structure thus formed. It is yet an object of this invention to provide a rigid or semi-rigid, foamed, aldehyde-condensation resin which has an extremely porous structure, but which at the same time has sufficient strength to be handled and used as a rigid or semi-rigid body. It is yet another object to provide an unique resin structure which is porous and in which the cell walls are broken, but which still possesses sufficient strength to be handled. It is another object to provide such an article in which the cellular structure can be materially strengthened without sacrificing any appreciable degree of its porosity. Other objects of the invention will in part be obvious and will in part be apparent hereinafter.

The invention accordingly comprises the several steps and the relation of one or more of such steps with respect to each of the others, and the article possessing the features, properties, and the relation of elements, which are exemplified in the following detailed disclosure, and the scope of the invention will be indicated in the claims.

The process of this invention may be further described with reference to the accompanying drawings in which:

FIG. 1 represents a schematic diagram of the process.

By the process of this invention, the resin to be formed into a foamed porous structure is dissolved or suspended in a liquid medium (generally water) which is then extended with a gas to form a foamed resin. Such resin-liquid systems will hereinafter be referred to as resin "dispersions," a term which includes solutions and suspensions. After foaming to the desired density, the catalyst is blended in and the resulting foamed material introduced into the desired mold form which may be a container which defines one or more sides of the foamed structure. Under most circumstances it will be desirable to neutralize the resulting porous structure, a step which can be accomplished either while the structure is still wet or after it has been dried. As will be apparent below, it is preferable to accomplish neutralization while the foam structure is still wet, but after it has attained sufficient green strength to be removed from the mold form and handled. The various properties of the foamed porous structure, i.e., rigidity or flexibility, density and cell size can readily be controlled by a proper choice of components, time of neutralization, and the like, as will hereinafter become apparent.

In FIG. 1 the process of this invention is illustrated with the attendant apparatus required for carrying out the process being shown diagrammatically. The liquid resin which is stored in a tank 10 is directed by means of pump 12 through conduit 14 to a mixing chamber 16. Simultaneously, pressurized air which has been compressed by compressor 18 and stored in storage tank 20 is directed through conduit 22 into mixing chamber 16 where the resin is atomized and thoroughly mixed with the air. From mixing chamber 16 the air-resin liquid mixture is conveyed through conduit 24 into apparatus designed to extend the resin with the air to form the foam. The extender is indicated as numeral 26 in FIG. 1. As the foam formed in extender 26 is removed through conduit 28, a catalyst taken from catalyst storage tank 30 and pumped through metering pump 31 is added to it. The foam and catalyst mixture is then passed through a suitable blender 32 which thoroughly and uniformly incorporates the catalyst into the foam without breaking it. If a filler is also to be introduced, it may be incorporated into the foam-catalyst mixture through line 33 which leads into conduit 28. The foamed resin is delivered through nozzle 34 connected to the blender 32. It will be appreciated that the line 35 leading to the nozzle 34 may be sufficiently long so that the foam may be injected where desired, for example, between the walls of a structure such as a house.

As will be apparent in FIG. 1, the porous structure, after it has been set up to the point it may be removed from the mold (i.e., has sufficient green strength), may be dried either at elevated temperatures or under ambient conditions; thus, for example, if it is desired to form insulation in place, such as between the walls of a building, drying 37 will take place actually in the mold form itself (the walls of the building) and no neutralization or further treatment will be necessary.

However, for most applications, even in the building industry, it will be desirable to form the porous structure in a mold form 36, remove it when it has assumed structural integrity and process it further, preferably by neutralization while still wet 38 and subsequent drying 39. As an alternative, the structure may be first dried 39a and then neutralized 38a, but care must be taken during drying to maintain the structural integrity of the molded porous form. It is therefore preferable to neutralize while wet as this permits control of the physical properties of the final porous structure since it permits controlling the flexibility of the structure, a property which in turn is related to the molecular weight of the resin formed. The step of neutralization will be discussed in more detail below and illustrated in the accompanying examples.

Finally, the dry porous structure may be treated with liquids which are capable of coating the rods defining the open cells to strengthen the foamed resin structure or give it some other desired property. This final optional step is shown as coating step 40.

The extender 26 may be any apparatus suitable for incorporating gas into the resin liquid to bring it up to the desired volume, that is to reduce its specific gravity to that desired in the final foam structure. Such apparatus includes, but is not limited to, whippers, beaters and devices of the general character which depend upon forcing the air-resin mixture through a tortuous path which increases in size from inlet to outlet to provide for the increase in foam volume as the process of extension proceeds.

One embodiment of a suitable extender comprises an elongated cylindrical housing in which are located spaced disks having holes, the size of which increases from inlet to outlet. The disk spacing may also increase. The hole positions are staggered to form the required tortuous path. Another type of extender which operates on essentially the same principle and is equally well suited is one which comprises a housing defining a channel which increases in diameter from entry to outlet. The channel is filled with beads which also increase in size from entry to outlet, thus providing an expanding tortuous path for foaming. Although air will most generally be used to extend the resin liquid, any gas which is essentially inert to the resin may be employed.

The blender 34 (FIG. 1) may be any suitable apparatus capable of gently, thoroughly and uniformly blending the small volume of catalyst throughout the foamed resin without appreciably increasing the specific gravity of the foam. One type of suitable blender comprises an elbow-shaped housing which is equipped at the elbow with means (e.g., a small rotating blade) for establishing a vortex at the point where the flow direction changes. The catalyst is metered into the resin forward of the vortex and is thus uniformly blended or kneaded throughout the foam. Another suitable type of blender is one which provides a splitting and reversing helical path as the blending means.

The resins suitable for foaming in accordance with the process of this invention may be defined as thermosetting resins formed by the condensation of formaldehyde or a formaldehyde-producing component with such materials as phenol, urea, melamine, resorcinol, or mixtures of these. Thermosetting resins thus produced are generally referred to as aldehyde-condensation resins and their manufacture is well known in the art. The resins, as used in this process, should of course not be fully cured. Rather, they should be either dispersible or soluble in water. The solids content of the resin liquid may vary between 10% and 50% by weight.

The liquid system (resin dispersion, surfactant and plasticizer, if used) may be heated up to about 150° F. prior to foaming. Heating has the advantage of decreasing the curing time which in turn permits the use of less catalyst. Heating also means that neutralization may be begun sooner, and if it results in the use of smaller amounts of catalyst, less neutralization is required.

The density of the finished porous article, within established limits of air-resin ratios, is controlled by the viscosity of the resin prior to foaming. The greater the viscosity of the liquid resin, the higher the density of the final porous structure. Generally, the greater the density the smaller will be the pore or cell size. The density of the liquid resin may be controlled in turn by varying the solids content of the resin, or by adding a viscosity builder to it. Generally, if the viscosity is increased without increasing the solids content, the density of the resulting porous material will be somewhat lower than if the viscosity were increased by increasing its solids content.

The density of the porous structure formed in accordance with the method of this invention may be varied over a wide range, for example, from about 0.1 to 12 pounds per cubic foot.

It is preferable that the resin liquid contain a surfactant in order to better form the foam required. The surfactant may be any of the well known cationic, anionic or nonionic surfactant available commercially. It may also be the type of surfactant generally called protein hydrolysate. It should be used in amounts ranging from about 1% to 8% by weight of the solids content of the resin. The amount and quality of the surfactant will, to a large extent, determine the average size of the cells of the porous structure. Generally, the greater the amount of surfactant used, the smaller the cell size for any given surfactant. The quality of the surfactant also influences the cell size. For example, the use of a cationic surfactant which was an n-alkyl trimethyl ammonium chloride produced larger cells than an equal amount of anionic surfactant which was a triethanolamine lauryl sulfate. Thus, it will be seen that in simple experiments with various surfactants and amounts of surfactants, the desired cell size may be obtained.

The catalyst should be one which is capable of setting up or curing the resin at room temperature in a foam form. Such catalysts include, but are not limited to, the strong mineral acids (e.g., phosphoric, hydrochloric and sulfuric), the Lewis acids (e.g., ammonium chloride, boron trifluoride, and the like), or other strong acid-producing materials. The amount of catalyst used ranges from about 0.2% to 5% by weight of the resin solids present. For ease of mixing it is normally introduced in the form of a concentrated aqueous solution although the pure catalyst material may be used.

Many fillers for these thermosetting resins are known in the art and any of them may be used in this invention. Such fillers may include rayon wastes, cellulose-derived material such as wood shavings, sawdust and the like, and glass fibers. It is possible to put up to 90% by weight of resins in the form of fillers in the foam.

The incorporation of a plasticizer is optional, and the choice and quantity of plasticizer will depend upon the physical characteristics desired in final foamed product. Any of the plasticizers which are commonly associated with the use of these resins may be incorporated to impart to the resulting foamed structure a desired degree of flexibility. Examples of suitable plasticizers include sorbitol and its derivatives such as polyoxyethylene sorbitan monopalmitate. Humectants, such a sugar, etc., may also be incorporated to introduce a controlled amount of water into the foamed resin, the later being a plasticizer for the resin.

It is also within the scope of this invention to incorporate other additives into the foamed structures such as preservatives for cut flowers if the foam is to serve as a plant support, dyes, pigments, and any other suitable material which may be required during the use of the foamed resin material.

As pointed out above, the step of neutralization is an important one in the construction of most of the porous structures made in accordance with this invention. Neutralization is required to remove the excess acid which is introduced into the resin system as a catalyst. In many instances, this excess acid would be corrosive and thus undesirable to have present. Neutralization is also helpful in eliminating the excess formaldehyde which is almost always present in an aldehyde-condensation resin. This elimination of formaldehyde is normally desirable because of the characteristic odor of formaldehyde. Finally, neutralization may be used to control the properties of the finished porous structure. By proper choice of the time at which neutralization is carried out, i.e., the amount of time which elapses between that point at which the foamed resin is introduced into the mold form and the time the neutralizing agent is introduced, the degree of flexibility of the finished structure is controlled. The sooner neutralization is accomplished the more flexible will be the porous structure. Thus, neutralization in this case actually stops the reaction before its is complete. Neutralization which is accomplished between about 20 and 180 minutes after the introduction of the foam into the mold form will give a porous structure which is flexible and which may be compressed without fracturing when wetted. This elapsed time before neutralization is carried out is also related to the rate of curing which in turn is dependent upon the temperature of the liquid just prior to foaming. If neutralization is carried out at a time beyond about 8 hours after introduction of the foam into the mold form, then a more rigid or less flexible porous structure is formed. If neutralization is accomplished after drying, then the most rigid type of structure is achieved. However, if this is the point of neutralization, then care must be taken to dry the porous structure in a manner to retain its structural integrity.

Generally, it is preferable to neutralize to the extent that all of the residual acid contained within the porous structure is reacted, and hence neutralized. Neutralization may be carried out with liquid or gaseous neutralizers which are preferably strong bases. Among the liquid neutralizers which may be used are ammonium hydroxide, sodium hydroxide, or potassium hydroxide. It is preferable, however, to use a gaseous neutralizer such as ammonia or some of the stronger organic volatile substituted ammonias such as mono-, di-, or trimethyl amine. The gaseous neutralizers are readily soluble in the water present in the wet porous structure, and have a great affinity for the water. Thus, they are rapidly drawn into the porous structure and are available for neutralization shortly after the structure has been exposed to them. If liquid neutralizers are used, then it is necessary to allow time for the liquid to diffuse into the foamed structures which normally float on the liquid. However, gaseous neutralizers may readily be introduced by merely exposing the wet porous structure to the gaseous atmosphere. In neutralizing a dried structure, it is possible to use a liquid or gaseous agent, but again gaseous ammonia is preferred.

As indicated above, neutralization provides a control over the physical properties of the porous structure as well as achieving the elimination of excess acid and formaldehyde order.

The porous structure thus formed may be subjected to additional treatments such as treatment with a liquid capable of coating the cell rods or cell walls, and contributing strength to the porous structure. Inasmuch as one of the novel properties of the structure is its extreme degree of porosity, it is desirable not to treat it to such an extent that the pores are permanently filled. Thus, it is possible to impregnate the porous structure with thermoplastic liquids such as asphalt, coal tar pitch, hydrocarbon resins; thermoplastics such as the vinyl and acrylic resins, paraffin and various waxes. Generally, it will not be desirable to use an impregnating agent which requires that it be heated above about 180° F. to render it sufficiently liquid to coat the cell rods. It is also possible to treat the porous structure with thermo-setting resins in liquid form, such as a water solution of phenol formaldehyde; or an urea-formaldehyde water dispersion. Such treating agents enhance the strength of the cell rods or cell walls, and if introduced only in quantities sufficient to coat the rods or walls they do not detract from the porosity of the structure.

It is also within the scope of this invention to form structures by covering one or more of the surfaces of a molded form material to modify or protect the surface of the porous structure, particularly in such uses as building materials and the like. Thus paper, paperboard, resin films and the like may be affixed to one or more surfaces of the foamed structure.

The invention may be described further in terms of specific examples which are meant to be illustrative and not limiting.

*Example 1*

To 575 pounds of a commercial grade, adhesive-type, urea-formaldehyde resin dispersion in water (66% solids content) were added 425 pounds of water and 5 pounds of a cationic surfactant which was a 50% water-isopropanol solution of an n-alkyl trimethyl ammonium chloride. The mixture thus formed, which was 30% by weight solids, was foamed in an apparatus which contained a number of perforated spaced disks supplying a tortuous path as described above. Into this foamed mixture was then kneaded 60 pounds of 75% phosphoric acid in an apparatus which provided a vortex at the point of blending. The resulting foamed material was then poured into forms and then removed after about 20 minutes at which time they possessed sufficient green strength to permit handling. After standing for 8 hours, the blocks were neutralized by placing them in a room into which ammonia gas was bled and circulated by fans. After the ammonia had built up to an 8% concentration, the forms were kept in the ammonia atmosphere for about one-half hour. After neutralization, the room was ventilated to remove excess ammonia through vaporization. The neutralized structures were then dried, the drying being accomplished at a temperature of about 120° F. Drying could also be accomplished at room temperature, or at temperatures higher than 120° F. under relatively high humidity conditions.

The resulting dried blocks were relatively rigid, contained cells which were small to medium in size (e.g., from about one-quarter to one mm.), and had a density of about 2 pounds per cubic foot. Blocks made of this formulation were also neutralized 2, 4 and 6 hours after the foam was introduced into the mold forms. These different sample blocks displayed an increasing degree of rigidity with increasing elapsed time before neutralization.

*Example 2*

The same formulation of Example 1 was foamed in the same manner except that 15 pounds of the surfactant was substituted for the 5 pounds of Example 1. Neutralization and drying were carried out as in Example 1. The cells were small in size, i.e., about 0.25 mm. It will be seen that the resulting foamed structure is extremely porous, both to liquid and gas, and that few if any cells are closed. Thin rods join the openings and in some cases are even broken.

*Example 3*

Forty pounds of the urea-formaldehyde resin of Example 1 was diluted with 32 pounds of water, and to this mixture was added 11 pounds of sorbitol (100%) which served as a plasticizer for the resin. This mixture had a 42% solids content. Two pounds of an anionic surfactant which was a triethanol amine lauryl sulphate was then added and the mixture foamed as in Example 1. A mixture of 1 pound of 85% phosphoric acid and 1 pound of 85% formic acid was then blended in the foam as the catalyst. The foam was introduced into mold forms and air-dried without neutralization. The cells of the porous structure thus formed were extremely small and the walls were very thin. The structure was somewhat frangible, but it was resilient. The material had a density of approximately 3 pounds per cubic foot.

*Example 4*

One hundred pounds of commercial grade, urea-formaldehyde resin (66% solids) was diluted with 40 pounds of water and then 30 pounds of sorbitol and 3 pounds of an n-alkyl trimethyl ammonium chloride were added as the surfactant. The resin mixture, which had a solids content of 57% by weight, was foamed and then 1 pound of 85% phosphoric acid was blended in as the catalyst. The foam was then introduced into mold forms, air-dried and subsequently neutralized with a water solution of 4% ammonium hydroxide. Because the forms floated on the surface of the neutralization liquid, they were forced into it to cause diffusion of the ammonium hydroxide through the blocks. The neutralizing liquid was then removed by draining and the blocks were dried in air. The resulting porous blocks had a density of 6 pounds per cubic foot and were somewhat more rigid than those of Example 2.

*Example 5*

Porous structures formed as in Example 2 were dried with various liquids to coat the thin rods forming the cell structure. The coating materials which were used were a 10% soultion of a colpolymer of vinyl chloride and vinyl acetate in a mixture of methyl isobutyl ketone and acetone, molten micro-crystalline wax, molten asphalt, and latices of synthetic rubber and acrylic rubbers. In treating the porous resin with these coating liquids the blocks were immersed in the liquid, the excess liquid was removed and the blocks were then dried. The dry coating material pick-up amounted to approximately the original weight of the foamed structure so that the pick-up was about 100% by weight. The treated structures were still porous and it was possible to readily pass smoke or gas through them. The treated structures moreover exhibited greater strength while still retaining a high degree of porosity to liquids.

The porous resin material thus produced may be described as being rigid to semi-rigid. The rods which define the cells are thin and substantially all of the cells are interconnected, thus accounting for the very high degree of porosity. The resin forming the rods may be characterized as being of a controlled molecular weight depending upon the point at which neturalization was accomplished. There is present within the foam small amounts of a salt, formed by the reaction of the acid catalyst and the neutralizing base provided, of course, the foamed structure was neutralized. There may also be a residual amount of surfactant, as well as plasticizer, additives and fillers.

The porous resin material formed has good insulation properties making it particularly adaptable to building uses. It can be formed as insuation in situ, or readily cut to any desired shape or size. Because this porous material is substantialy completely open in structure, it readily absorbs and holds liquid. It can, moreover, as shown above, be made with a wide range of flexibility, density and cell size.

It will thus be seen that the objects set forth above, among those made apparent from the preceding description, are efficiently attained and, since certain changes may be made in carrying out the above method and in the article set forth without departing from the scope of the invention, it is intended that all matter contained in the above description or shown in the accompanying drawings shall be interpreted as illustrative and not in a limiting sense.

I claim:

A method of forming a resin structure, comprising the steps of
 (a) mechanically extending an aqueous solution of urea-formaldehyde resin, having a resin concentration between 10 and 50 percent by weight and containing a surfactant, with air thereby to form a stable foam;
 (b) blending into said foam an acid catalyst capable of curing said urea-formaldehyde resin at room temperature, said blending being effected without any appreciable decrease in foam volume;
 (c) introducing said foam into a mold form capable of defining at least one side of a porous resin structure;
 (d) neutralizing said acid catalyst after said foam has acquired sufficient strength to be structurally intact but before said urea-formaldehyde has been dried and cured, said neutralizing consisting of treating said foam with an externally applied base until substantially all of the acid catalyst has been reacted;
 (e) removing the residual liquid from the neutralized foam structure;
 (f) drying the resulting neutralized foam structure;
 (g) immersing the resulting dry, neutralized resin foam structure in a liquid containing a material which can be deposited in solid form and selected from the group consisting of a solution of a copolymer of vinyl chloride and vinyl acetate and molten wax; and
 (h) withdrawing said foam structure from said liquid and solidifying said material within said structure.

References Cited by the Examiner

UNITED STATES PATENTS

| | | | |
|---|---|---|---|
| 2,964,424 | 12/1960 | Mast | 117—98 |
| 3,006,871 | 10/1961 | Sunderland | 260—2.5 |
| 3,057,750 | 10/1962 | Bennett et al. | 117—98 |
| 3,063,952 | 11/1962 | Vieli | 260—2.5 |
| 3,138,563 | 6/1964 | Morgan et al. | 260—2.5 |
| 3,189,479 | 7/1965 | Coppick et al. | 260—2.5 |

FOREIGN PATENTS 230,162   9/1960   Australia.

MURRAY TILLMAN, *Primary Examiner.*

M. FOELAK, *Assistant Examiner.*